(12) United States Patent
Otosaka

(10) Patent No.: US 7,987,686 B2
(45) Date of Patent: Aug. 2, 2011

(54) MANUFACTURING APPARATUS OF POROUS GLASS BASE MATERIAL

(75) Inventor: Tetsuya Otosaka, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 881 days.

(21) Appl. No.: 10/594,529

(22) PCT Filed: Mar. 7, 2005

(86) PCT No.: PCT/JP2005/003926
§ 371 (c)(1),
(2), (4) Date: Sep. 28, 2006

(87) PCT Pub. No.: WO2005/092803
PCT Pub. Date: Oct. 6, 2005

(65) Prior Publication Data
US 2007/0209397 A1      Sep. 13, 2007

(30) Foreign Application Priority Data

Mar. 29, 2004    (JP) .................................. 2004-094496

(51) Int. Cl.
*C03B 37/018*    (2006.01)
(52) U.S. Cl. ................. 65/413; 65/414; 65/421
(58) Field of Classification Search .......... 65/413, 65/414, 421, 27, 168
See application file for complete search history.

(56) References Cited

U.S. PATENT DOCUMENTS

| | | | |
|---|---|---|---|
| 2002/0162363 A1* | 11/2002 | Wada et al. ................. | 65/414 |
| 2003/0015004 A1 | 1/2003 | Nakamura et al. | |
| 2004/0134236 A1* | 7/2004 | Ishihara ..................... | 65/421 |

FOREIGN PATENT DOCUMENTS

| | | |
|---|---|---|
| CN | 1397507 | 2/2003 |
| JP | 64-53728 | 4/1989 |
| JP | 2000-109327 | 4/2000 |
| JP | 2003-34540 | 2/2003 |
| JP | 2004-532178 | 10/2004 |

OTHER PUBLICATIONS

Chinese Office Action dated May 8, 2009 with English-language translation.

* cited by examiner

*Primary Examiner* — Queenie Dehghan
(74) *Attorney, Agent, or Firm* — McGinn IP Law Group, PLLC

(57) ABSTRACT

There is provided a manufacturing apparatus of a porous glass base material which can prevent soot from being formed on an upper surface (ceiling) of the process chamber, and reduce the amount of soot that comes off the upper surface and falls. A manufacturing apparatus of a porous glass base material 4 deposits glass particles produced by subjecting a material gas to flame hydrolysis, onto a starting member 1 placed vertically. Here, a plurality of gas inlets 5 are provided in one or more lateral walls of a process chamber including a burner 2 for the deposition therein, in upper portions of the lateral walls and along a ceiling of the process chamber.

14 Claims, 3 Drawing Sheets

MANUFACTURING APPARATUS OF POROUS GLASS BASE MATERIAL

TECHNICAL FIELD

The present invention relates to a manufacturing apparatus of a porous glass base material. Such a manufacturing apparatus deposits glass particles on a target rod (starting member) that is rotated and vertically placed.

The contents of the patent application identified below are incorporated herein by reference, if applicable.
   Japanese Patent Application No. 2004-94496
   Filed on Mar. 29, 2004

BACKGROUND ART

A high-purity synthetic quartz glass used for manufacturing optical fiber base materials and the like can be obtained in the following manner. A glass material such as silicon tetrachloride is subjected to flame hydrolysis in an oxyhydrogen flame, so that glass particles (silica powders) are produced. The produced glass particles are deposited onto a starting member such as a quartz glass while the starting member is rotated, so that a porous glass base material is manufactured. The porous glass base material is sintered and vitrified into a transparent glass.

There are several different methods to manufacture a porous glass base material, such as the vapor phase axial deposition (VAD) method, the outside VAD method, and the outside vapor deposition (OVD) method. FIG. 1A shows the VAD method. To be specific, a glass material is supplied to a burner 2 so that glass particles are produced. The produced glass particles are deposited onto the end of a starting member 1. Here, a porous glass base material 4 is grown in the axial direction of the starting member 1 in such a manner that a shaft 3 coupled to the starting member 1 is moved upwards while rotated via a hanging mechanism (not shown). FIG. 1B shows the outside VAD method, whereby the porous glass base material 4 is grown in the axial direction of the starting member 1 along the lateral surface of the starting member 1. FIG. 1C shows the OVD method, whereby the porous glass base material 4 is grown in the radial direction of the starting member 1 in such a manner that the burner 2 is reciprocated in a relative manner along the lateral surface of the starting member 1. Here, it should be noted that the number of burners 2 is one in FIGS. 1A to 1C, but can be appropriately increased as needed.

Here, some of the produced glass particles are not deposited onto the starting member to manufacture the porous glass base material. Part of the non-deposited glass particles keep floating within the process chamber, to be attached and deposited onto the wall of the process chamber as soot, and the rest are exhausted outside the process chamber together with the exhaust gas.

Here, a piece of the soot may come off the wall and then be attached to the deposition surface of the porous glass base material which is being manufactured by deposition. The piece of the soot is turned into a bubble as a result of vitrification of the porous glass base material into a transparent glass. Such a bubble is present in a finished product, resulting in quality degradation.

To solve this problem in relation to the soot, the following technique is disclosed by Patent Document 1. A slit-like gas inlet 5 is provided, in the vicinity of the ceiling, in a lateral wall of a process chamber at the side where a burner 2a for a core, a burner 2b for heating the core, and burners 2c for a clad are provided, as shown in FIG. 2. In addition, an exhaust outlet 6 is provided in a lateral wall that opposes the gas inlet 5. This configuration produces an air curtain effect whereby a gas supplied from the gas inlet 5 flows into the exhaust outlet 6 along the ceiling. Accordingly, the soot to be formed on the ceiling can be significantly reduced.

In recent years, however, the size of optical fiber base materials has been on the rise because of demand for rationalized manufacture of optical fibers, cost reduction, and the like. This tendency makes it necessary to manufacture porous glass base materials of a large size, resulting in an increase in the amount of the glass material supplied. As the amount of the glass material supplied to the process chamber is increased, the amount of floating glass particles that are not deposited onto the starting member accordingly increases. Considering this, the technique disclosed by Patent Document 1 can not fully prevent the soot from being formed on the walls of the process chamber. Therefore, a piece of the soot may come off the walls and fall, to be attached to the deposition surface of the porous glass base material.

This drawback is clearly shown in FIG. 3, which illustrates the gas flow at the level of the gas inlet of FIG. 2. To be specific, since the gas flowing from the gas inlet is partly blocked by the porous glass base material, a swirling gas flow in the reverse direction is formed on a section of the ceiling which is closer to the exhaust outlet. This swirling gas flow keeps therein floating glass particles for a long time period, and the floating glass particles are attached as soot onto the ceiling.

Furthermore, the technique disclosed in Patent Document 1 can not reduce the amount of the soot formed on the lateral walls of the process chamber.

[Patent Document 1] Unexamined Japanese Patent Application Publication No. 2002-193633

DISCLOSURE OF THE INVENTION

Problems to be Solved by the Invention

An advantage of some aspects of the present invention is to provide a manufacturing apparatus of a porous glass base material which can prevent soot from being formed on the upper surface (ceiling) of a process chamber and reduce the amount of soot that comes off the upper surface and falls. This is achieved by combining the features recited in the independent claims. The dependent claims define further effective specific example of the present invention.

Means for Solving the Problems

An embodiment of the invention provides a manufacturing apparatus of a porous glass base material for depositing glass particles produced by subjecting a material gas to flame hydrolysis, onto a starting member placed vertically. Here, a plurality of gas inlets are provided in one or more lateral walls of a process chamber including a burner for the deposition therein, in upper portions of the lateral walls and along a ceiling of the process chamber.

The present invention includes a variety of embodiments. The plurality of gas inlets may be provided in lateral walls that oppose each other with a porous glass base material being positioned therebetween. Furthermore, slit-like gas inlets may be provided along left and right edges of a lateral wall on which the burner is provided.

It is preferable that an exhaust outlet is provided in a lateral wall that opposes the lateral wall on which the burner is provided, and that a width of the lateral wall in which the exhaust outlet is provided is made smaller than a width of a lateral wall in which a gas inlet is provided.

Here, it is preferable that one of the gas inlets is provided in the lateral wall in which the exhaust outlet is provided, and that a distance between a lowest part of the gas inlet and a highest part of the exhaust outlet is preferably 30 mm or more.

The ceiling and lateral walls of the process chamber along which a gas supplied from the gas inlets flows may be preferably formed by flat surfaces.

Here, all the necessary features of the present invention are not listed in the summary. The sub-combinations of the features may become the invention.

Effect of the Invention

By using the manufacturing apparatus relating to the embodiment of the invention having the above-described configurations, soot is prevented from being formed on the ceiling and lateral walls of the process chamber. In addition, even though a piece of the formed soot comes off the ceiling and lateral walls and falls, the piece of the soot is prevented from being attached to the porous glass base material. Thus, bubbles which may be created in a finished product can be reduced, thereby producing a high-quality optical fiber base material.

BRIEF DESCRIPTION OF THE DRAWINGS

FIG. 1 includes schematic vertical cross-sectional views illustrating methods of manufacturing a porous glass base material, where

FIG. 4 includes schematic views illustrating an example of a manufacturing apparatus of a porous glass base material relating to an embodiment of the invention, where

BEST MODE FOR CARRYING OUT THE INVENTION

Hereinafter, an embodiment of the present invention will be described. The embodiment does not limit the invention according to the claims, and all the combinations of the features described in the embodiment are not necessarily essential to means provided by aspects of the invention.

Figure 1C:
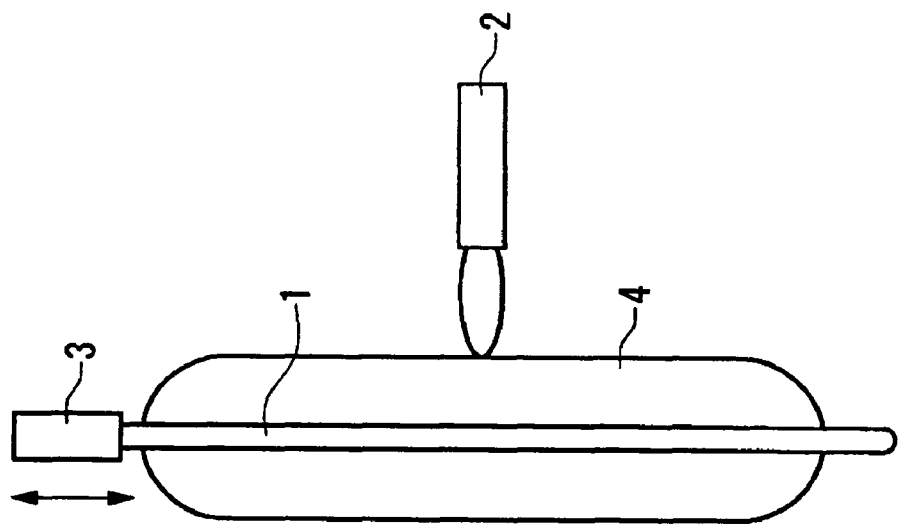
FIG. 1C shows the OVD method.
Figure 1B:
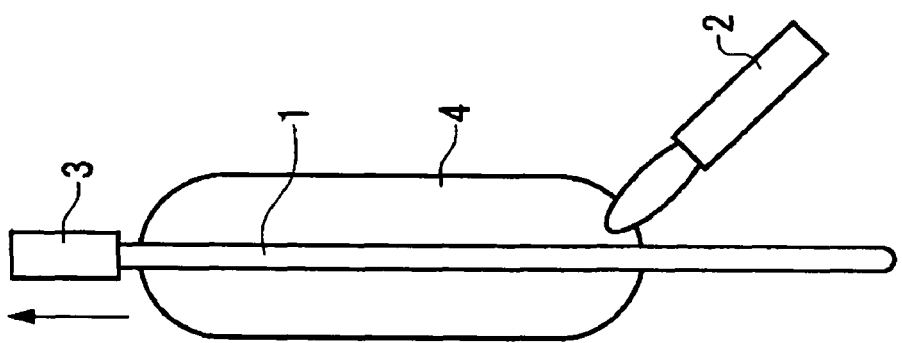
FIG. 1B shows the outside VAD method.
Figure 1A:
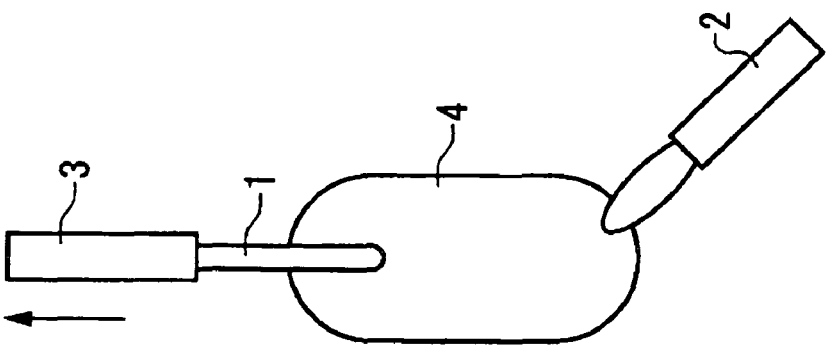
FIG. 1A shows the VAD method.
Figure 2:
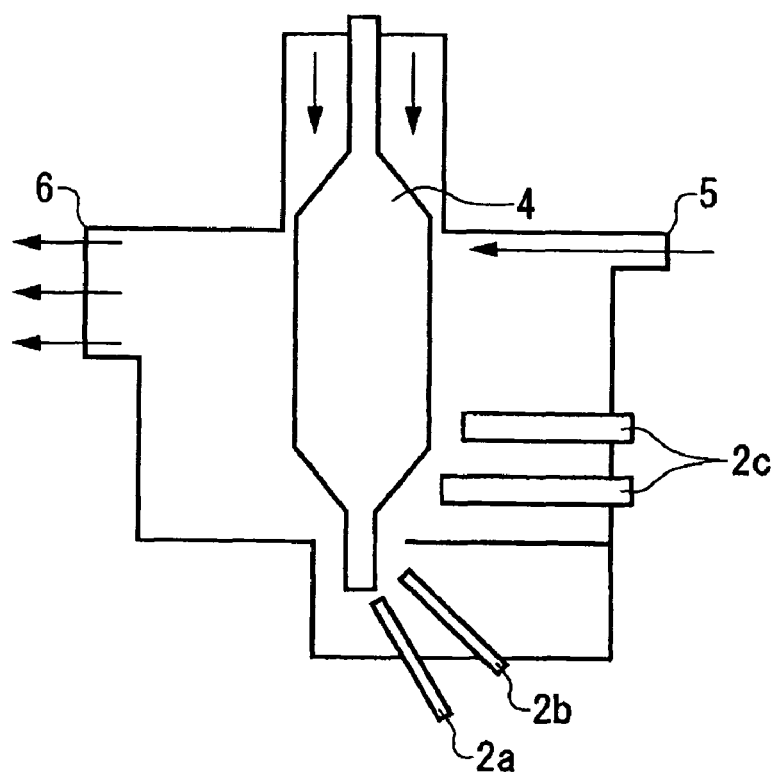
FIG. 2 is a schematic vertical cross-sectional view illustrating a typical manufacturing apparatus of a porous glass base material.
Figure 3:
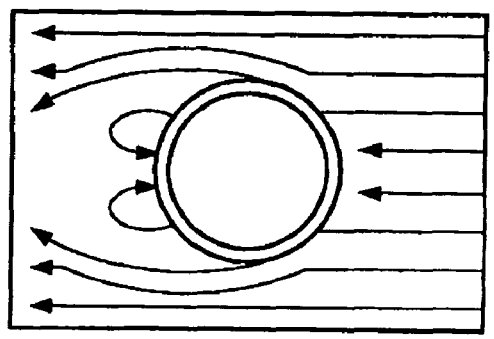
FIG. 3 is a schematic view illustrating a gas flow formed at the level of a gas inlet of the manufacturing apparatus illustrated in FIG. 2.

A manufacturing apparatus relating to an embodiment of the invention is characterized in that a plurality of gas inlets are provided in one or more lateral walls of a process chamber. Specifically speaking, the process chamber has a burner for deposition, and the plurality of gas inlets are provided in the upper portions of the lateral walls and along the ceiling of the process chamber. The plurality of gas inlets may be preferably provided in lateral walls that oppose each other with a porous glass base material being positioned therebetween. Having the above configuration, the manufacturing apparatus can achieve a flow of a fresh intake gas across the entire ceiling, without causing the swirling gas flow shown in FIG. 3. As a consequence, floating glass particles are prevented from reaching the ceiling.

Furthermore, slit-like gas inlets may be provided along the left and right edges of the lateral wall on which the burner for deposition is provided. This configuration can stabilize the gas flow in the process chamber, and significantly reduce the amount of the soot formed on the lateral walls of the process chamber.

Furthermore, an exhaust outlet may be provided in the lateral wall that opposes the lateral wall on which the burner for deposition is provided, and the width of the lateral wall in which the exhaust outlet is provided is designed to be smaller than the width of the lateral wall in which any of the gas inlets is provided. With the above configurations, the linear speed of the gas flow on the side of the exhaust outlet with respect to the porous glass base material can be increased with the linear speed of the gas flow on the side of the burner being kept relatively slow. This can reduce disturbance in the flame of the burner.

When one of the gas inlets is provided in the lateral wall in which the exhaust outlet is provided, the distance between the lowest part of the gas inlet and the highest part of the exhaust outlet is designed to be 30 mm or larger for the following reason. An excessively small distance between the gas inlet and exhaust outlet causes the exhaust gas flow to disturb the gas flow formed along the ceiling starting from the gas inlet. As a result, the air curtain effect is degraded, which accordingly reduces the effect of preventing the soot from being formed on the ceiling.

The upper and lateral surfaces of the process chamber along which the gas supplied from the gas inlets flows may be preferably formed by flat surfaces for the following reason. If the lateral wall is configured by a surface of a sphere having a small curvature radius of approximately 200 mm to 400 mm or a curved surface of a cylinder, the gas supplied from the gas inlets does not flow along the wall, but causes a swirling flow. Accordingly, the gas flow in the process chamber is disturbed, which results in degradation of the air curtain effect.

The embodiment of the invention is described in more detail with reference to an example in the following part. It should be noted that, however, the present invention is not limited to the following example, but includes various other embodiments.

Example

A porous glass base material was manufactured by using a manufacturing apparatus shown FIG. 4.

Figure 4A:
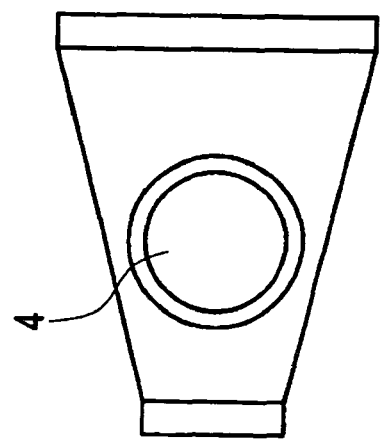
FIG. 4A is a top view (burners are not shown)
Figure 4B:
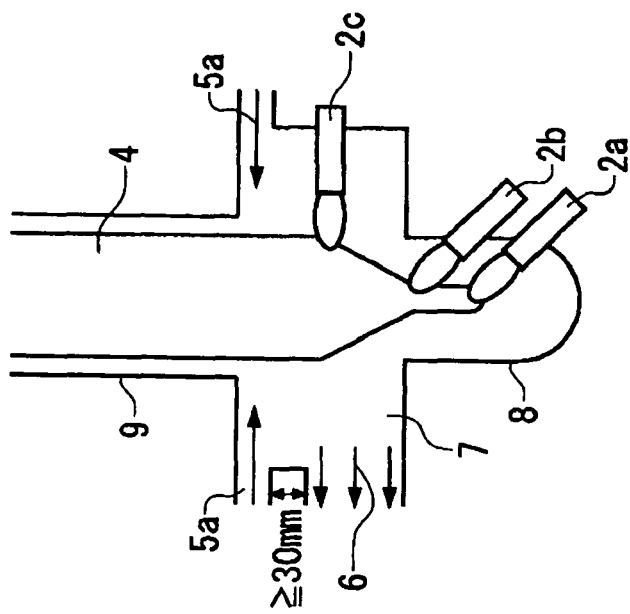
FIG. 4B is a schematic vertical cross-sectional view.
Figure 4C:
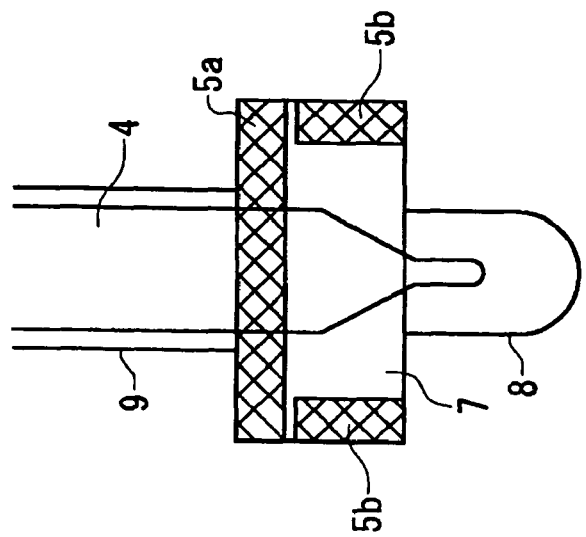
FIG. 4C is a right lateral view (the burners are not shown).

FIG. 4A is a top view of the manufacturing apparatus (burners are not shown), FIG. 4B is a schematic vertical cross-sectional view of the manufacturing apparatus, and FIG. 4C is a right lateral view of the manufacturing apparatus (the burners are not shown).

In the manufacturing apparatus, gas inlets 5a are provided in the left and right lateral walls that oppose each other, in the upper portions of the left and right walls and along the ceiling as shown in FIG. 4B. Here, the distance between the lower edge of the gas inlet 5a in the left lateral wall and the upper edge of an exhaust outlet 6 is 30 mm. Furthermore, slit-like gas inlets 5b are provided in the right lateral wall along the left and right edges thereof, in addition to the gas inlets 5a along the ceiling, as shown by the shaded parts in FIG. 4C.

To perform deposition of glass particles, a burner 2a for a core, a burner 2b for heating the core, and a burner 2c for a clad are provided in an upper process chamber 7 and a lower process chamber 8. A porous glass base material 4 is pulled upwards via an upper portion 9 considering the growth of the porous glass base material 4. In this example, the deposition of glass particles was performed under a condition that the glass particles were produced and supplied by all the burners at the rate of 700 g/hr. During the deposition, a gas flow layer was formed along the ceiling and lateral walls with its linear speed being set to 1.5 n/sec, and the glass particles that were not attached to the deposition surface of the porous glass base material 4 were exhausted from the exhaust outlet 6 together with the exhaust gas. The supplied gas was an air kept within a clean room. The gas inlets were provided with a wire mesh made of SUS316 as pressure loss providing means that adjusts the linear speed of gas intake.

Under the conditions set forth above, the deposition of the glass particles was performed for 30 hours. The result is that soot was substantially perfectly prevented from being formed on the ceiling and the right portion of each of the front and back walls in which neither gas inlets nor exhaust outlets are provided. Here, soot was formed on and came off the lower left portion (i.e. in the vicinity of the exhaust outlet) of each of the front and back walls. However, a piece of the soot that came off the lower left portion was immediately exhausted from the exhaust outlet, and thus was not attached to the deposition surface of the porous glass base material, thereby not producing a bubble in a finished product.

The exemplary manufacturing apparatus relating to the embodiment of the present invention shown in FIG. 4 can be applied to the outside VAD and OVD methods in addition to the VAD method employed in the above-described example.

While the embodiment of the present invention has been described, the technical scope of the invention is not limited to the above-described embodiment. It is apparent to persons skilled in the art that various alternations and improvements can be added to the above-described embodiment. It is also apparent from the scope of the claims that the embodiments added with such alternations or improvements can be included in the technical scope of the invention.

INDUSTRIAL APPLICABILITY

The manufacturing apparatus relating to the embodiment of the invention can provide a glass base material for an optical fiber which has only few bubbles therein and demonstrate excellent optical characteristics.

The invention claimed is:

1. A manufacturing apparatus of a porous glass base material for depositing glass particles produced by subjecting a material gas to flame hydrolysis, onto a starting member placed vertically,
wherein a plurality of gas inlets is provided in lateral walls of a process chamber including a burner for the deposition therein,
wherein two or more of the plurality of gas inlets are provided both in upper portions of said lateral walls as well as along a ceiling of the process chamber,
wherein at least one of the two or more gas inlets is provided in a first lateral wall and at least one of the two or more gas inlets is provided in a second lateral wall that opposes the first lateral wall with a porous glass base material being positioned therebetween, and
wherein said burner is located in either said first or said second lateral wall, which includes said gas inlets.

2. The manufacturing apparatus according to claim 1, wherein slit-like gas inlets are provided in the process chamber, along left and right edges of said lateral wall on which the burner is provided.

3. The manufacturing apparatus according to claim 2, wherein an exhaust outlet is provided in a lateral wall that opposes the lateral wall on which the burner is provided.

4. The manufacturing apparatus according to claim 2, wherein one of the gas inlets is provided in a lateral wall in which an exhaust outlet is provided, and a distance between a lowest part of the gas inlet and a highest part of the exhaust outlet is 30 mm or more.

5. The manufacturing apparatus according to claim 2, wherein the ceiling and lateral walls of the process chamber along which a gas supplied from the gas inlets flows have flat surfaces.

6. The manufacturing apparatus according to claim 1, wherein an exhaust outlet is provided in the lateral wall that opposes a lateral wall on which the burner is provided.

7. The manufacturing apparatus according to claim 6, wherein a width of the lateral wall in which the exhaust outlet is provided is smaller than a width of a lateral wall in which a gas inlet is provided.

8. The manufacturing apparatus according to claim 7, wherein the ceiling and lateral walls of the process chamber along which a gas supplied from the gas inlets flows have flat surfaces.

9. The manufacturing apparatus according to claim 6, wherein one of the gas inlets is provided in the lateral wall in which the exhaust outlet is provided, and a distance between a lowest part of the gas inlet and a highest part of the exhaust outlet is 30 mm or more.

10. The manufacturing apparatus according to claim 6, wherein the ceiling and lateral walls of the process chamber along which a gas supplied from the gas inlets flows have flat surfaces.

11. The manufacturing apparatus according to claim 1, wherein one of the gas inlets is provided in a lateral wall in which an exhaust outlet is provided, and a distance between a lowest part of the gas inlet and a highest part of the exhaust outlet is 30 mm or more.

12. The manufacturing apparatus according to claim 11, wherein the ceiling and lateral walls of the process chamber along which a gas supplied from the gas inlets flows have flat surfaces.

13. The manufacturing apparatus according to claim 1, wherein the ceiling and lateral walls of the process chamber along which a gas supplied from the gas inlets flows have flat surfaces.

14. The manufacturing apparatus according to claim 1, wherein an intaking gas flows in the first lateral wall opposite to a direction that an intaking gas flows in the second lateral wall.

* * * * *